United States Patent
Legein et al.

(10) Patent No.: US 11,167,311 B2
(45) Date of Patent: Nov. 9, 2021

(54) HYDROPHILIC, MULTIFUNCTIONAL ULTRA-THIN COATINGS WITH EXCELLENT STABILITY AND DURABILITY

(71) Applicant: Europlasma NV, Oudenaarde (BE)

(72) Inventors: Filip Legein, Oudenaarde (BE); Eva Rogge, Oudenaarde (BE); Samir Loulidi, Oudenaarde (BE)

(73) Assignee: Europlasma NV, Oudenaarde (BE)

( * ) Notice: Subject to any disclaimer, the term of this patent is extended or adjusted under 35 U.S.C. 154(b) by 0 days.

(21) Appl. No.: 16/348,523

(22) PCT Filed: Nov. 8, 2017

(86) PCT No.: PCT/EP2017/078676
§ 371 (c)(1),
(2) Date: May 9, 2019

(87) PCT Pub. No.: WO2018/087192
PCT Pub. Date: May 17, 2018

(65) Prior Publication Data
US 2019/0358668 A1  Nov. 28, 2019

(30) Foreign Application Priority Data
Nov. 9, 2016  (EP) ..................................... 16198015

(51) Int. Cl.
| | | |
|---|---|---|
| *B05D 1/00* | (2006.01) | |
| *B05D 7/00* | (2006.01) | |
| *C09D 129/10* | (2006.01) | |
| *C09D 183/04* | (2006.01) | |
| *C09D 183/08* | (2006.01) | |

(52) U.S. Cl.
CPC ................. *B05D 1/62* (2013.01); *B05D 7/54* (2013.01); *C09D 129/10* (2013.01); *C09D 183/04* (2013.01); *C09D 183/08* (2013.01)

(58) Field of Classification Search
CPC ....................................................... B05D 1/62
See application file for complete search history.

(56) References Cited

U.S. PATENT DOCUMENTS

| | | | | |
|---|---|---|---|---|
| 5,665,280 A | * | 9/1997 | Tropsha ................... | B05D 1/62 264/483 |
| 9,173,974 B2 | * | 11/2015 | Gorne ....................... | B05D 5/04 |
| 2008/0044592 A1 | | 2/2008 | Elkin | |
| 2009/0069790 A1 | * | 3/2009 | Yokley ..................... | A61L 29/14 604/523 |
| 2013/0323291 A1 | * | 12/2013 | Li ........................ | C09D 133/26 424/409 |
| 2014/0336758 A1 | | 11/2014 | Gorne | |

FOREIGN PATENT DOCUMENTS

| | | |
|---|---|---|
| CN | 101890314 A | 11/2010 |
| CN | 102432905 A | 5/2012 |
| EP | 0995762 A2 | 4/2000 |
| EP | 1806388 A1 | 7/2007 |
| EP | 2705859 A1 | 3/2014 |
| EP | 2792380 A2 | 10/2014 |
| JP | 2008050492 A | 3/2008 |
| WO | 0016914 A1 | 3/2000 |
| WO | 03012893 A2 | 2/2003 |
| WO | 2006046003 A1 | 5/2006 |
| WO | 2006019175 A1 | 5/2008 |
| WO | 2012133154 A1 | 10/2012 |
| WO | 2015096876 A1 | 7/2015 |
| WO | 2016057867 A1 | 4/2016 |

\* cited by examiner

*Primary Examiner* — Michael P Wieczorek
(74) *Attorney, Agent, or Firm* — James Creighton Wray (57) ABSTRACT

The present invention relates to hydrophilic, multi-functional ultra-thin coatings deposited onto substrates for different applications, with excellent performance in terms of stability and durability. The present invention also describes improved methods to deposit the hydrophilic, multi-functional ultra-thin coatings of the present invention. The coatings are deposited by means of a low pressure and low power plasma polymerization. The present invention also comprises substrates coated with a method and a coating according as described in the present invention.

5 Claims, 2 Drawing Sheets

HYDROPHILIC, MULTIFUNCTIONAL ULTRA-THIN COATINGS WITH EXCELLENT STABILITY AND DURABILITY

This application claims the benefit of European Application No. 16198015.6 filed Nov. 9, 2016 and PCT/EP2017/078676 filed Nov. 8, 2017, International Publication No. WO 2018/087192 A1, which are hereby incorporated by reference in their entirety as if fully set forth herein.

TECHNICAL FIELD

The present invention relates to hydrophilic, multi-functional ultra-thin coatings (nanocoatings) deposited onto substrates for different applications, with excellent performance in terms of stability and durability. The present invention also describes improved methods to deposit the hydrophilic, multi-functional ultra-thin coatings of the present invention. The coatings are deposited by means of a low pressure and low power plasma polymerization. The present invention also comprises substrates coated with such a method and a coating obtained by such methods according to the present invention.

BACKGROUND OF THE INVENTION

The present invention relates to methods to deposit hydrophilic, multi-functional ultra-thin coatings (nanocoatings) on substrates, wherein the coatings have excellent properties such as durability, e.g. against humidity, and stability, e.g. thermal stability. The nanocoatings are deposited using a low pressure and low power plasma polymerisation process, preferably at low power.

Target applications for the nanocoatings of the present invention are medical applications—lenses, catheters, stents, bandages, blood filters—, biochemical applications, e.g. cultivation plates, electrochemical applications—fuel cells, batteries, and the like, and application on membranes and textiles, for example used in filtration applications, e.g. blood filtration, and in separation application, e.g. battery separator textiles. The hydrophilic nature is often used to reduce bonding with organic materials and in a reduction of blood coagulation. Further, the hydrophilic nature is often used to imply an increased bonding with biomolecules, e.g. for analysis purposes, or to stimulate bone and tissue growth. The bonding with water is also improved, resulting in an excellent wettability.

Several hydrophilic treatments and processes exist already. One way to deposit hydrophilic coatings is by using a wet chemical process, which typically uses complex compounds of monomers and additives, leads to thicker coatings (thickness in the micrometer range), requires substantial amounts of water, chemicals and energy, and has consequently a high environmental footprint.

WO2006019175 describes a photo-curable composition for forming an anti-fogging coating by means of a wet chemical process, using a compound of chemicals, including a urethane compound, an epoxy compound and (meth)acrylic acid.

JP4698529 describes an anti-fogging film obtained by means of a wet chemical coating process using (meth)acrylic acid and a (meth)acrylic acid alkyl ester.

It is clear that the wet chemical methods require thus a complex compound consisting of different chemical products, to make a good emulsion, dispersion or solution. The present invention overcomes these requirements by using a low pressure and low power plasma polymerization, wherein the monomer is used in its pure form, and whereby no additives are needed. The power consumption of the plasma polymerization process can be kept low compared to these wet chemical methods, since there is no need for drying or curing at elevated temperatures.

Another way to deposit hydrophilic coatings is by plasma graft polymerization. These processes, like all plasma processes, don't require water, and use lower amounts of chemicals. However, in graft polymerisation the liquid monomer is typically sprayed onto the substrate or applied in the form of an aqueous solution, and is then cured to induce polymerization and cross-linking. This requires at least a 2-step process, and high power—thus high energy consumption—for the curing to induce polymerization and cross-linking. The opposite order of steps is also used in some prior art documents.

CN101890314 describes a method for a hydrophilic treatment on polytetrafluoroethylene (PTFE) by means of graft polymerization. In a first step, a low pressure plasma pre-treatment is performed without the presence of monomer, to induce the graft polymerization. In a second step, the polymerization is realised by bringing the plasma pre-treated substrate in contact with the liquid monomer.

WO2012133154 as well describes a plasma graft polymerization of acrylic acid to obtain a polyacrylic acid coating on a PMMA substrate. The process comprises 4 steps: spraying of liquid acrylic acid monomer, argon plasma for curing, again spraying of liquid acrylic acid monomer, and again argon plasma for curing.

CN102432905 describes a 3-step process, wherein a Corona (air) pre-treatment is performed, followed by spraying of the acrylic acid monomer through a nozzle onto the substrate, followed by UV curing for polymerization and cross-linking.

US2014336758, EP2705859, EP2792380 and WO2015096876 describe all four a 3-step method for deposition of hydrophilic coatings on surfaces of medical devices, wherein the coatings have water contact angles below 10°. The 3-step process consists of a plasma pre-treatment, e.g. for microroughening of the substrate, followed by PECVD (plasma enhanced chemical vapour deposition) of acrylic acid, followed by a CVD process (chemical vapour deposition) of acrylic acid, without a plasma being present. These methods as described all need an additional step, the CVD step, to obtain a hydrophilic coating with acceptable performance. It is clear that this makes the process more complex and requires increased consumption of monomer.

EP0995762 describes a method to deposit anti-fouling coatings on biomedical devices, such as stents, catheters and intraocular lenses, wherein a coating is deposited with low pressure plasma polymerization, wherein the polymeric coating is strongly grafted to the substrate's surface. The polymer has hydrophilic properties to prevent the adhesion of proteins, cells and lipids.

US2009069790 describes a method to obtain a well-adhering coating with increased surface energy, to increase reactions of device materials with surrounding tissue, wherein a stacked process is performed. A two-step cycle is repeated several times until the required functionality has been obtained. The two-step cycle comprises an inert gas plasma treatment as the first step, and a low pressure plasma grafting polymerization step as second step.

WO03012893 describes a method to obtain a hydrophilic coating on a battery separator membrane, wherein the membrane is brought in contact with the monomer, and wherein the monomer is polymerized in a next step by exposure to radiation.

A third method described in prior art to deposit hydrophilic coatings is by means of atmospheric pressure plasma, wherein the acrylic acid monomer is brought into the deposition area by means of a carrier gas, e.g. an inert gas such as helium. To exclude the influence of the atmosphere, the electrodes are planar and are placed close to each other (mm to cm range), which limits use of the method for complex 3D-shaped substrates, such as skiing glasses and headlights of cars. The power used between the electrodes is typically in the range of kW, e.g. 1 to 2 kW (1000 to 2000 W) for a distance between the planar electrodes in the mm range. The present invention improves on the prior art by providing a method to deposit hydrophilic, multi-functional ultra-thin coatings onto substrates, wherein the nanocoatings have excellent stability and durability, wherein the substrates may be planar (2D) or complex shaped (3D)—e.g. finished products, and wherein the method improves upon the prior art methods by:

Dry and clean process: no consumption of water
Ultra-thin, invisible coatings
Use of monomer, no compounds and additives needed
Low power, hence low energy consumption
Reduced complexity of processing steps
Excellent stability and durability of the coatings

SUMMARY OF THE INVENTION

The present invention relates to hydrophilic, multi-functional ultra-thin coatings deposited onto substrates for different target applications, with excellent performance in terms of stability and durability. The present invention also describes improved methods to deposit the hydrophilic, multi-functional ultra-thin coatings of the present invention. The nanocoatings are deposited by means of a low pressure and low power plasma polymerization. The present invention also comprises substrates coated with a method and a coating as described in the present invention.

The present invention in particular relates to a method for depositing a hydrophilic, multi-functional ultra-thin coating onto a substrate according to claim 1.

The present invention also relates to a method for depositing a hydrophilic, multi-functional ultra-thin coating onto a substrate, comprising the steps of:
optionally performing a first pre-treatment on the substrate; subsequently
optionally providing an intermediate nanocoating on the substrate by exposing said substrate to a low pressure plasma polymerization process with a first precursor monomer;
optionally subsequently performing a second pre-treatment on the substrate provided with the optional intermediate nanocoating; and subsequently
providing a hydrophilic, multi-functional ultra-thin coating onto the substrate with the optional intermediate nanocoating, by exposing said substrate with the optional intermediate nanocoating to a low pressure and low power plasma polymerization process with a second precursor monomer which is different than said first precursor monomer, whereby the second precursor monomer is of the formula (I):

$$CH_2=CR_4-CH_2-O-R_5 \qquad (I),$$

wherein $R_4$ is H or an alkyl, e.g. —$CH_3$, and wherein $R_5$ is H, an alkyl or an alkenyl, a substituted alkyl or a substituted alkenyl group. The alkyl or alkenyl groups, the substituted alkyl or substituted alkenyl groups of $R_5$ may comprise from 1 up to 10 carbon atoms, and may be linear or branched. $R_5$ preferably comprises one or multiple hydrophilic functional groups, such as hydroxyl groups and/or carbonyl groups. Hereby, in the most preferred embodiments of the present invention, $R_5$ is a substituted alkyl or a substituted alkenyl group, preferably comprising from 1 up to 10 carbon atoms, and may be linear or branched.

Herein, the plasma polymerization process refers to a process wherein the first or second monomer is introduced in the plasma chamber wherein the substrate is located, and wherein a plasma is ignited by electrical or electromagnetical discharge over the radiofrequent and ground electrodes positioned inside the plasma chamber, thereby creating a reactive first or second precursor from the monomer, wherein the precursor is the monomer which is brought into plasma state. The precursor then polymerizes on the exposed surface of the substrate, thereby forming a polymer coating. The steps of reactivating the monomer and subsequent polymerization all happen in the same plasma chamber wherein the substrates to be coated are positioned. In this respect, it is important to realize that no free radical initiators need to be used since the inventors found that the monomer, and in particular the second precursor monomer, is reactive enough to strike the plasma without any support from free radical initiators and/or inert carrier gases. Hence, in a preferred embodiment, no free radical initiator is used in the present invention. The electrical or electromagnetical discharge is obtained by generating a continuous wave (cw) radiofrequent (RF) field in the plasma chamber, e.g. via a set of radiofrequent and ground electrodes positioned within the chamber. The power input to generate the cw-RF field is continuously non-zero and is for the second precursor preferably kept constant at a pre-set value between 0.02 W/l and 2.50 W/l for plasma chambers of 50 l or more, for the Applicant has discovered that such low powers allow to obtain polymer coatings with the best quality and optimal composition in terms of bonds and functional groups, in particular when using the monomers according to formula I, and even more in particular whereby $R_5$ is a substituted alkyl or a substituted alkenyl group.

With this method, a coating which is hydrophilic and well-adhering to the substrate can be obtained for a multitude of substrates and applications. This leads to a significant reduction in installation and production costs, as the method can be and preferably is applied largely independently from the type of substrate in a single plasma chamber.

The Applicant has surprisingly discovered that the coating of the present invention has a much better stability and durability in terms of e.g. thermal aging than the prior art coatings, such as low pressure plasma coatings deposited from acrylic acid as a monomer. Without being bound to any particular theory, it is believed that the improvement is created by a combination of three functionalities present in the monomer:

Better or more hydrophilic functional groups in the monomer and the resulting coating, which allow for more polarity;
The presence of an ether function (R—O—R') in the monomer and the resulting coating, which allows for hydrogen bonds to be formed between the molecules in the polymer structure, adding additional strength to the coating. More, these bonds are no covalent bonds, so in case they are broken during conditions such as high temperature and/or humidity, they are ready to be reformed once the conditions stabilize, in this way maintaining its excellent hydrophilic properties, and ensuring excellent stability and durability in a range of conditions. Furthermore, the presence of the ether function and the possibility of forming hydrogen bonds with liquids such as water seem to add to the hydrophilicity of the resulting coating;

A carbon-carbon double bond (C=C) in the monomer, which allows for a plasma being struck by using low power, and preferably continuous wave, conditions and without the need for supporting molecules such as free radical initiators or inert carrier gasses. This allows for easy polymerization when the right processing conditions are being used, giving lead to strong covalent bonds with the substrate or the optionally intermediate nanocoating, and strong bonds between the coating molecules, which leads to a strongly connected 3D-network (contrary to graft polymerization that focusses on grafting the molecules to the substrate's surface).

In this respect, the Applicant has found that the use of continuous-wave plasma polymerization process at low power, i.e. below 2.5 W/l for the second precursor, presents unexpectedly better results with respect to the coating's hydrophilic properties, its stability and durability under a range of conditions (temperature, humidity) and process speed than other processes, in particular pulsed plasma polymerization processes or high power polymerization processes. Again, without wishing to be bound by theory, the Applicant believes this is due to the low power continuous wave plasma polymerization process allowing the coating layer to grow while keeping most of the ether functional groups and the hydrophilic functional groups in the structure intact, combined with optimal crosslinking through covalent bonds, whereas a high power cw process may destroy the hydrogen bonds formed between ether functions and may remove the hydrophilic functional groups during growth of the coating layer, and whereas a pulsed process, wherein peaks of up to 200 W/l could be necessary to ignite the plasma, the peaks being separated by periods without any energy being delivered to the monomers, may not offer enough energy to form crosslinking.

The Applicant has further found that the method according to the present invention is more scalable than prior art methods, due to the combination of the choice of monomer and the continuous-wave plasma polymerization step. Hence, the method of the present invention is preferably performed using a plasma chamber of 50 l or larger, more preferably 100 l or larger, still more preferably 200 l or larger, yet more preferably 300 l or larger, even more preferably 400 l or larger, yet even more preferably 500 l or larger, such as 500 l, 600 l, 700 l, 800 l, 900 l, 1000 l, or any value therebetween or even larger than 1000 l.

The present invention also relates to substrates provided with a coating according to a method of the present invention.

DETAILED DESCRIPTION OF THE INVENTION

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, elements, members or steps, known in the art or disclosed therein.

The term "hydrophilic" as used herein to denote the property of the coating, indicates that a water contact angle of less than 90° is achieved. As will become clear from the present disclosure, coatings with very small water contact angles can be achieved with the present invention, such as at most 20° or even at most 10°, such as 9°, 8°, 7°, 6°, 5°, 4°, 3°, 2°, 1°, 0° or any value in between. Using the method of the present invention, coated surfaces with essentially vanishing water contact angle can be achieved, i.e. coated surfaces which can be completely wetted with water.

The term "multi-functional" as used herein to denote the property of the coating, indicates that the coating can have other properties than the hydrophilic property.

The coating may provide the substrate also with protection against mechanical abrasion and friction or with protection against environmental factors. The inventors have also surprisingly found that the coating may also have other, non-obvious properties as disclosed further in this document.

The recitation of numerical ranges by endpoints includes all numbers and fractions subsumed within that range, as well as the recited endpoints.

The present invention improves on the prior art by providing a method to deposit hydrophilic, multi-functional ultra-thin coatings onto substrates, wherein the coatings have excellent stability and durability, wherein the substrates may be planar (2D) or complex shaped (3D), and wherein the method is a low pressure and low power plasma polymerization.

It is a first aspect of the present invention to provide a method to deposit a hydrophilic, multi-functional ultra-thin coating on a substrate, whereby the nanocoating is deposited by means of a low pressure and low power plasma polymerization.

It is a second aspect of the present invention to provide a method to obtain a hydrophilic, multi-functional ultra-thin coating on textiles, whereby the nanocoating has excellent stability and durability.

In a first embodiment, the low pressure and low power plasma polymerization is a low pressure and low power plasma polymerization of a precursor monomer which is introduced into the plasma chamber in a gaseous state, preferably without the use of any free radical initiator, the precursor monomer being of the formula (I):

$$CH_2=CR_4-CH_2-O-R_5 \quad (I),$$

wherein $R_4$ is H or an alkyl, e.g. —$CH_3$, and wherein $R_5$ is H, an alkyl, an alkenyl, a substituted alkyl or a substituted alkenyl group. Preferably, $R_5$ is a substituted alkyl or a substituted alkenyl group. The substituted alkyl or substituted alkenyl groups of $R_5$ may comprise from 1 up to 10 carbon atoms, and may be linear or branched. $R_5$ preferably comprises one or multiple hydrophilic functional groups, such as hydroxyl groups and/or carbonyl groups.

In a particular preferred embodiment, $R_4$ is H and $R_5$ is —$CH_2$—$CH(OH)_2$, indicating 3-allyloxy-1,2-propanediol.

The Applicant has surprisingly discovered that the coating of the present invention has a much better stability and durability in terms of e.g. thermal aging than the prior art coatings, such as low pressure plasma coatings deposited from acrylic acid as a monomer. Without being bound to any particular theory, it is believed that the improvement is created by a combination of three functionalities present in the monomer:
  Better or more hydrophilic functional groups in the monomer and the resulting coating, which allow for more polarity;
  The presence of an ether function (R—O—R') in the monomer and the resulting coating, which allows for hydrogen bonds to be formed between the molecules in the polymer structure, adding additional strength to the coating. More, these bonds are no covalent bonds, so in case they are broken during conditions such as high temperature and/or humidity, they are ready to be reformed once the conditions stabilize, in this way maintaining its excellent hydrophilic properties, and ensuring excellent stability and durability in a range of conditions. Furthermore, the presence of the ether function and the possibility of forming hydrogen bonds with liquids such as water seem to add to the hydrophilicity of the resulting coating;
  A carbon-carbon double bond (C=C) in the monomer, which allows for a plasma being struck by using low power conditions, and preferably continuous wave, and without the need for supporting molecules such as free radical initiators or inert carrier gasses. This allows for easy polymerization when the right processing conditions are being used, giving lead to strong covalent bonds with the substrate or the optionally intermediate nanocoating, and strong bonds between the coating molecules, which leads to a strongly connected 3D-network (contrary to graft polymerization that focusses on grafting the molecules to the substrate's surface).

Preferably, for coating 3D items (e.g. finished products), the plasma polymerization time, expressed in the time that a power is applied to the electrode layers, is from about 1 minute to about 20 minutes, more preferably from about 2 minutes to about 15 minutes, such as from about 5 minutes to about 10 minutes, such as 10, 9, 8, 7, 6, or 5 minutes.

The applicant has further noted that these effects are particularly pronounced when the precursor monomer of formula (I) is plasma polymerized using a continuous wave plasma polymerization process at low power, i.e. below 2.5 Watt per liter volume of the plasma chamber. Such a low power continuous wave presents unexpectedly better results with respect to the coating's hydrophilic properties, its stability and durability under a range of conditions (temperature, humidity) and process speed (deposition rate) than other processes. Applicants have surprisingly found that it is beneficial to perform the plasma polymerization as a continuous wave plasma polymerization, wherein a constant power strictly higher than 0 W is applied during the plasma polymerization time. By applying an optimal low non-zero power value, the plasma polymerization will give a coating of good quality, wherein the fragmentation of the monomer is well controlled, making the use of inert carrier gasses and/or free radical initiators unnecessary, wherein the functional groups that give the hydrophilic properties are maintained whilst a good crosslinking of the polymer and a good bonding with the substrate is realized, which leads to improved performance. And additional benefit of using a continuous wave plasma polymerization wherein a constant power strictly higher than 0 W is applied is that the deposition rate is found to be higher than with pulsed plasma polymerization, leading to shorter coating times and shorter total cycle time, and consequently reduced cost. One important aspect of the present process is that the provided continuous wave power value ensures continuous creation of plasma consisting of monomers of formula (I) without creation of extensive monomer fragmentation. This allows the deposition of a crosslinked coating structure throughout the full thickness of the deposited coating layer. In practice, the applicant has found that the minimal power value is about 0.02 Watt per liter volume of the plasma chamber to ensure enough energy to bring sufficient monomers in plasma condition for plasma polymerization without creation of extensive monomer fragmentation.

Preferably, the plasma chamber comprises one or more electrode layers, which may be radiofrequency electrode layers or ground electrode layers, to generate an electromagnetic field.

Preferably, the or each radiofrequency electrode layer generates a high frequency electric field at frequencies of from 20 kHz to 2.45 GHz, more preferably of from 40 kHz to 13.56 MHz, with 13.56 MHz being preferred.

Preferably, when used in a 280 litre plasma chamber having 4 trays for containing the products to be coated, each tray having electrode layers positioned above and below for optimal uniformity over the whole chamber, the applied power for the coating process, when applied in continuous wave mode, is approximately 5 to 600 W, more preferably approximately 10 to 250 W, even more preferably 15 to 100 W, say 100, 90, 80, 75, 70, 60, 50, 45, 40, 35, 30, 25, 20 or 15 W. In plasma chambers of other volumes, a power density equivalent to the above ranges for a 280 litre plasma chamber is preferably used.

Preferably, the operating pressure (so-called work pressure) for the coating step is approximately 1.33 to 66.66 Pa (10 to 500 mTorr), preferably approximately 2.00 to 26.66 Pa (15 to 200 mTorr), more preferably approximately 2.67 to 20.00 Pa (20 to 150 mTorr), say 3.33 to 13.33 Pa (25 to 100 mTorr), say less than 13.33 Pa (100 mTorr), 12.00 Pa (90 mTorr), 10.67 Pa (80 mtorr), 9.33 Pa (70 mtorr), 8.00 Pa (60 mTorr), 6.67 Pa (50 mTorr), 5.33 Pa (40 mTorr), 4.00 Pa (30 mTorr), or 3.33 Pa (25 mTorr). For example, in a 280 litre plasma chamber, such pressure ranges are particularly preferred.

Preferably, the thickness of the hydrophilic, multi-functional nanocoating is from about 50 to about 1000 nm, more preferably from about 75 to about 750 nm, such as from about 100 nm to about 500 nm, say 500, 475, 450, 425, 400, 375, 350, 325, 300, 275, 250, 225, 200, 175, 150, 125, 100, 95, 90, 85, 80, or 75 nm.

A pre-treatment may be carried out prior to the low pressure and low power plasma polymerization step. Preferably, the pre-treatment is a low pressure plasma process. Whether a low pressure plasma pre-treatment is carried out or not, depends on the cleanliness of the substrates to be coated, and on the monomer used in the low pressure plasma polymerization process as well.

The applicants have surprisingly discovered that for some monomers the performance and quality of the hydrophilic, multi-functional ultra-thin coating is better when no pre-treatment is carried out. For other monomers, a pre-treatment in the form of a low pressure plasma cleaning and/or activation and/or etching may be advantageous.

In an embodiment, a pre-treatment step in the form of an activation and/or cleaning and/or etching step is performed prior to the plasma polymerization process. A pre-treatment step in the form of an activation and/or cleaning and/or etching step might be advantageous for improving the adhesion and cross-linking of the polymer coating.

When a low pressure plasma pre-treatment is performed, this pre-treatment is preferably done using reactive gases, e.g. $H_2$, $O_2$, $CO_2$, and/or etching reagents such as $CF_4$, but also inert gases, such as Ar, $N_2$ or He may be used. Mixtures of the foregoing gases may be used as well.

Preferably the pre-treatment is done with $O_2$, Ar, or a mixture of $O_2$ and Ar.

Preferably, when applied in a batch process to coat complex 3D-shaped products, the pre-treatment is performed from 15 seconds to 15 minutes, for example from 30 seconds to 10 minutes, preferably 45 seconds to 5 minutes, e.g. 5, 4, 3, 2, or 1 minutes. The duration of the pre-treatment depends on the precursor monomer used, on the design and the materials of the substrate to be coated, on the degree of contamination on the substrate to be coated, and on the low pressure plasma equipment.

Preferably the power of the pre-treatment is applied in continuous wave mode. Preferably, for a 280 litre plasma chamber, the pre-treatment takes place at powers of 10 to 1000 W, more preferably 25 to 750 W, even more preferably at 50 to 600 W, such as 75 to 500 W, say 500, 450, 400, 350, 300, 250, 200, 150, 125, 100, or 75 W. In plasma chambers of other volumes, a power density equivalent to the above ranges for a 280 litre plasma chamber is preferably used.

Preferably, the or each radiofrequency electrode layer generates a high frequency electric field at frequencies of from 20 kHz to 2.45 GHz, more preferably of from 40 kHz to 13.56 MHz, with 13.56 MHz being preferred.

Preferably, the operating pressure (so-called work pressure) for the pre-treatment step is approximately 1.33 Pa to 66.66 Pa (10 to 500 mTorr), preferably approximately 2.67 to 33.33 Pa (20 to 250 mTorr), more preferably approximately 3.33 to 26.66 Pa (25 to 200 mTorr), say 6.67 Pa to 20.00 Pa (50 to 150 mTorr), say less than 20.00 Pa (150 mTorr), 18.67 Pa (140 mTorr), 17.33 Pa (130 mTorr), 16.67 Pa (125 mTorr), 16.00 Pa (120 mTorr), 14.67 Pa (110 mTorr), 13.33 Pa (100 mTorr), 12.00 Pa (90 mTorr), 10.67 Pa (80 mtorr), 9.33 Pa (70 mtorr), 8.00 Pa (60 mTorr), or 6.67 Pa (50 mTorr).

When a pre-treatment is used, the hydrophilic, multi-functional ultra-thin polymer coating is applied in a next step, which may be carried out in the same equipment.

Preferably, the pre-treatment and the coating step are carried out in the same chamber without opening the chamber in between the steps, to avoid deposition of additional contamination from the atmosphere in between pre-treatment step and coating step.

The applicants have also discovered that it may be advantageous to apply an ultra-thin intermediate nanocoating before applying the actual hydrophilic, multi-functional ultra-thin coating of the present invention. When a pre-treatment is performed, the ultra-thin intermediate nanocoating is preferably deposited after the pre-treatment and prior to the low pressure plasma polymerization of the actual hydrophilic, multi-functional nanocoating of the present invention, but may be deposited prior to the pre-treatment as well. Optionally two pre-treatments can be performed on the substrate: a first pre-treatment before applying the intermediate nanocoating and a second pre-treatment after applying the intermediate nanocoating and before applying the hydrophilic coating.

Preferably, the ultra-thin intermediate nanocoating is deposited by means of a low pressure plasma polymerization process. In an embodiment, the low pressure plasma polymerization is a low pressure plasma polymerization of an organosilane precursor monomer which is introduced into a plasma chamber, said organosilane being of the formula (II).

$$Y_1—X—Y_2 \quad \text{(II) or}$$

wherein X is O or NH, $Y_1$ is —$Si(Y_3)(Y_4)Y_5$ and $Y_2$ is $Si(Y_{3'})(Y_{4'})Y_{5'}$, wherein $Y_3$, $Y_4$, $Y_5$, $Y_{3'}$, $Y_{4'}$, and $Y_{5'}$ are each independently H or an alkyl group of up to 10 carbon atoms; wherein at most one of $Y_3$, $Y_4$ and $Y_5$ is hydrogen, at most one of $Y_{3'}$, $Y_{4'}$ and $Y_{5'}$ is hydrogen; and the total number of carbon atoms is not more than 20.

The organosilane monomer is preferably introduced into the plasma chamber in a gaseous state.

For some substrates, especially glass and glass-like substrates, applying an ultra-thin intermediate nanocoating is particularly preferred. In the case of glass and glass-like substrates, in an even more preferred embodiment, the precursor monomer used for the intermediate nanocoating is an organosilane precursor according to formula (II). Without wishing to be bound by theory, the excellent results of applying an intermediate nanocoating based on an organosilane precursor monomer on glass or glass-like substrate prior to applying the hydrophilic coating, could be due to the half-organic, half-inorganic nature of the organosilane monomer. This monomer has chemical properties, such as type of binding, allowing it to well adhere to a large range of substrates, in particular to glass and to glass-like surfaces, while at the same time resulting in a layer with physico-chemical properties such as inter-atomic distances, elasticity and in particular thermal expansion coefficient, which are intermediate between the corresponding properties of the substrate and of the hydrophilic, multi-functional coating layer.

The present invention also relates to a method for depositing a hydrophilic, multi-functional ultra-thin coating onto a substrate, comprising the steps of:
optionally performing a first pre-treatment on the substrate; subsequently
optionally providing an intermediate nanocoating on the substrate by exposing said substrate to a low pressure plasma polymerization process with a first precursor monomer;

optionally subsequently performing a second pre-treatment on the substrate provided with the optional intermediate nanocoating; and subsequently providing a hydrophilic, multi-functional ultra-thin coating onto the substrate with the optional intermediate nanocoating, by exposing said substrate with the optional intermediate nanocoating to a low pressure and low power plasma polymerization process with a second precursor monomer which is different than said first precursor monomer—preferably without the use of a free radical initiator and/or an inert carrier gas to strike the plasma.

In a preferred embodiment, the second precursor monomer is of the formula (I):

$$CH_2=CR_4-CH_2-O-R_5 \quad (I),$$

wherein $R_4$ is H or an alkyl, e.g. —$CH_3$, and wherein $R_5$ is H, an alkyl or an alkenyl, a substituted alkyl or a substituted alkenyl group. Preferably $R_5$ is a substituted alkyl or a substituted alkenyl group. The substituted alkyl or substituted alkenyl groups of $R_5$ may comprise from 1 up to 10 carbon atoms, and may be linear or branched. $R_5$ preferably comprises one or multiple hydrophilic functional groups, such as hydroxyl groups and/or carbonyl groups.

In one embodiment, $R_4$ is H and $R_5$ is —$CH_2$—$CH(OH)_2$, indicating 3-allyloxy-1,2-propanediol.

In an embodiment, the first precursor monomer comprises one or more atoms equal to one or more atoms present in the substrate. In a preferred embodiment, the first precursor monomer comprises an atomic group equal to an atomic group present in the substrate. The term "atomic group" herein refers to a bonded group of at least two atoms.

The monomers are preferably introduced into the plasma chamber in a gaseous state.

In a preferred embodiment, the first precursor monomer is an organosilane of the formula (II).

$$Y_1-X-Y_2 \quad (II) \text{ or}$$

wherein X is O or NH, $Y_1$ is —$Si(Y_3)(Y_4)Y_5$ and $Y_2$ is $Si(Y_3)(Y_4)Y_5$ wherein $Y_3$, $Y_4$, $Y_5$, $Y_{3'}$, $Y_{4'}$, and $Y_{5'}$ are each independently H or an alkyl group of up to 10 carbon atoms; wherein at most one of $Y_3$, $Y_4$ and $Y_5$ is hydrogen, at most one of $Y_{3'}$, $Y_{4'}$ and $Y_{5'}$ is hydrogen; and the total number of carbon atoms is not more than 20.

In some embodiments, the method may comprise the step of introducing an additional gas to the plasma chamber in combination with the precursor monomer used for the intermediate nanocoating step. The additional gas is to be seen as a functional gas that contributes to the low pressure plasma polymerization reaction in terms of striking the plasma to ignite the plasma, or in terms of influencing the low pressure plasma polymerization reaction to realize coatings with a better performance and/or higher deposition rate.

The additional gas may be $H_2$, $N_2$, $O_2$, $N_2O$, $CO_2$, $CH_4$, He or Ar, or mixtures thereof, most preferably $O_2$ or $CO_2$.

Preferably, when an additional gas is used during the intermediate nanocoating step, the flow of additional gas introduced to the chamber is about 1 to about 75% of the monomer flow. More preferably, the flow of additional gas introduced to the chamber is about 5 to about 50% of the monomer flow, e.g. about 10 to 20% of the monomer.

Preferably, the thickness of the intermediate nanocoating is from about 5 to about 250 nm, more preferably from about 10 to about 200 nm, such as from about 15 nm to about 150 nm, say from about 20 nm to about 100 nm, say 100, 95, 90, 85, 80, 75, 70, 65, 60, 55, 50, 45, 40, 35, 30, 25, or 20 nm.

Preferably, the plasma polymerization of the intermediate nanocoating is a continuous wave plasma polymerization.

Preferably, when used in a 280 litre plasma chamber, the applied power for the coating process, applied in continuous wave mode, is approximately 5 to 1000 W, more preferably approximately 25 to 750 W, even more preferably 50 to 500 W, say 500, 475, 450, 425, 400, 375, 350, 325, 300, 275, 250, 225, 200, 175, 150, 125, 100, 90, 80, 75, 70, 60, or 50 W. In plasma chambers of other volumes, a power density equivalent to the above ranges for a 280 litre plasma chamber is preferably used.

The applied power for the coating process lies between 0.02 and 2.50 Watt per liter volume of the plasma chamber, preferably between 0.09 W/l and 2.68 W/l, more preferably between 0.12 W/l and 1.80 W/l, such as 1.70 W/l, 1.60 W/l, 1.50 W/l, 1.40 W/l, 1.30 W/l, 1.20 W/l, 1.10 W/l, 1.00 W/l, 0.90 W/l, 0.80 W/l, 0.70 W/l, 0.60 W/l, 0.50 W/l, 0.40 W/l, 0.30 W/l, 0.20 W/l, or 0.15 W/l or any value there between.

Preferably, the plasma chamber comprises one or more electrode layers, which may be radiofrequency electrode layers or ground electrode layers, to generate an electromagnetic field.

Preferably, the or each radiofrequency electrode layer generates a high frequency electric field at frequencies of from 20 kHz to 2.45 GHz, more preferably of from 40 kHz to 13.56 MHz, with 13.56 MHz being preferred.

Preferably, the operating pressure (so-called work pressure) for the intermediate nanocoating step is approximately 1.33 to 66.66 Pa (10 to 500 mTorr), preferably approximately 2.00 to 26.66 Pa (15 to 200 mTorr), more preferably approximately 2.67 to 20.00 Pa (20 to 150 mTorr), say 3.33 to 13.33 Pa (25 to 100 mTorr), say less than 13.33 Pa (100 mTorr), 12.00 Pa (90 mTorr), 10.67 Pa (80 mtorr), 9.33 Pa (70 mtorr), 8.00 Pa (60 mTorr), 6.67 Pa (50 mTorr), 5.33 Pa (40 mTorr), 4.00 Pa (30 mTorr), or 3.33 Pa (25 mTorr). For example, in a 280 litre plasma chamber, such pressure ranges are particularly preferred.

In a particularly preferred embodiment, the plasma chamber is temperature controlled, e.g. to avoid temperature differentials within the chamber, and to avoid cold spots where the process gas, i.e. the monomer vapour or the monomer gas, and optionally the additional gas, can condensate. For instance, the door, and some or each wall(s) of the vacuum chamber may be provided with at least one temperature control means. Alternatively, or additionally, one or more electrodes in the plasma chamber which are used to strike a plasma, may comprise temperature control means, such as a lumen through which a liquid at a controlled temperature can flow. The plasma chamber is preferably temperature controlled during the plasma polymerization step wherein an ultra-thin hydrophilic, multi-functional coating is provided and/or wherein an ultra-thin intermediate nanocoating is provided, to avoid condensation of the precursor monomer. The plasma chamber is preferably also temperature controlled during the pre-treatment step prior to the plasma polymerization step wherein an ultra-thin hydrophilic nanocoating is provided and/or wherein an ultra-thin intermediate nanocoating is provided.

By introducing a precursor monomer in a gaseous state into the plasma chambers and by controlling the temperature of the plasma chamber such that condensation of the monomer is avoided, the quality of the resulting coating can be increased considerably. Condensation of the monomer could lead to less polymerisation and to resulting sticky products. Furthermore, contamination of the plasma chamber, in particular the walls or electrodes, with condensed monomer which is possibly partially polymerised, can also be avoided.

Preferably, the temperature control means maintains the temperature from room temperature to 90° C., more preferably from between 40 and 60° C.

Preferably, when the electrode layers are radiofrequency electrode layers, they are temperature controlled as well to ensure even further uniformity of temperature inside the plasma chamber.

Preferably, also the pump, the liquid monomer supply and all connections between those items and the plasma chamber are temperature controlled as well to avoid cold spots where the process gas or gases can condense.

Preferably, the method comprises coating the polymer substrate to lower the contact angle, measured according to ASTM D5946, and to increase the surface energy, measured according to ASTM D2578-04.

Performance of the coating is measured by performing a water contact angle test on the substrates, according to ASTM D5946.

The coatings of the present invention, deposited by the method as described above, lead to water contact angles lower than or equal to 30° after treatment, even lower than or equal to 20°, more preferable around 15° and lower, such as 15, 14, 13, 12, 11, 10, 9, 8, 7, 6, 5, 4, 3, 2, 1, or 0°.

The performance of the coatings of the present invention may be evaluated in terms of stability and durability as well.

Stability may be measured by performing an aging test, whereby the samples are exposed to an elevated temperature for a prolonged time, e.g. 4 hours at 150° C.

Further, stability may be tested as well in a thermal cycle test, where temperature and relative humidity are varied according to a set schedule.

Durability of the coating may be tested by repeating the water contact angle measurement on the same spot of the coated substrate.

By depositing the hydrophilic, multi-functional ultra-thin coatings of the present invention, not only hydrophilic properties are obtained, but the following properties can also be improved significantly:

Reduced coagulation, e.g. of components in blood;
Resistance against acid media;
Increased surface tension:
  Improved transport of fluids;
  Improved absorption of aqueous fluids, e.g. improved wicking effect;

Hence, the present invention also concerns the use of a coating as obtained by a method according to the present disclosure for any or any combination of the following:

for reducing coagulation;
for increasing the resistance against acid media;
for increasing the surface tension, preferably for improving transport of fluid and/or for improving absorption of aqueous fluids, e.g. for promoting wicking.

EXAMPLES

In order that the invention may be more readily understood, it will now be described by way of the following non-limiting examples.

Glass substrates, e.g. used for biochemical analysis (culture growth plates), have been treated with different processes according to the present invention.

Evaluation of coating processes and the influence of different parameters has been done by measuring the water contact angle, according to ASTM D5946, before and after testing. The untreated, uncoated substrate has a water contact angle of 41.9°.

The coating equipment used was a 280 litre chamber with 4 trays to comprise the products to be coated, each tray having an electrode positioned above and an electrode positioned below the tray.

The applicants have found that hydrophilic coatings deposited by low pressure plasma polymerization using acrylic acid as a precursor monomer lead to issues in industrial environments due to the reactivity of the acrylic acid. Typically, liquid acrylic acid is stored in bottles wherein an inhibitor is used and an atmosphere containing approx. 20-25% oxygen is present. Acrylic acid tends to create easily radicals by itself, which react in their turn with the acrylic acid, leading to rapid polymerization. The inhibitor and the oxygen containing atmosphere reduce the production rate of radicals and neutralise the formed radicals. However, in low pressure plasma processing, the oxygen containing atmosphere is no longer present, and by evaporating the monomer for controlled introduction of monomer vapour in the chamber for the low pressure polymerization process, the inhibitor is no longer present in the vapour. As soon as the vapour reaches a cold spot, it condensates and polymerizes with itself due to absence of oxygen atmosphere and inhibitor, easily leading to blockage of the tubes of the plasma equipment.

The monomer of the present invention solves this issue because it is far less reactive and doesn't polymerize with itself. In terms of industrial applicability and ability for scaling up, the monomer of the present invention is able to solve the issues encountered with for example acrylic acid.

Further, acrylic acid is a dangerous monomer, its vapour can create severe burns when coming into contact with the human skin, and its smell is pungent. The monomer of the present invention doesn't create burns when coming into contact with the human skin—although direct contact with the skin should be avoided for all chemicals, by using suitable personal protective equipment—and its smell is much more neutral.

To make a comparative test, the existing acrylic acid coating is used as a benchmark for the coating of the present invention. The untreated surface has also been tested for reference. Both coatings are deposited in a plasma chamber of 130 litre volume.

Example 1: Aging Test—Thermal Stability

The coatings have been evaluated for thermal stability by performing an aging test. The samples were placed in an oven at ambient relative humidity, and were brought at a temperature of 150° C. for 4 hours. Afterwards, they were allowed to cool down.

1.1. Comparison with Benchmark Coating

The coating of the present invention is compared with the untreated substrate and with a benchmark coating. The benchmark coating is a hydrophilic coating deposited by low pressure plasma polymerization as well, using acrylic acid as monomer. The benchmarking coating is deposited according to the parameters in Table 1, the coating of the present invention according to the parameters in Table 2.

TABLE 1

Process parameters for the benchmark low pressure plasma coating

| Parameter | Value |
|---|---|
| Plasma Chamber | |
| Volume | 130 litre |
| Temperature wall | 40-60° C. |
| Electrode layers | RF/ground |
| Pre-treatment | |
| Gas | Oxygen |
| Flow | 200 sccm |
| Power | 200 W |
| Frequency | 13.56 MHz |
| Time | 5 minutes |
| Coating | |
| Monomer | Acrylic acid |
| Flow | 50-60 sccm |
| Additional gas | None |
| Flow (% of monomer flow) | — |
| Base pressure | 10-20 mTorr |
| Work pressure | 30-50 mTorr |
| Power | 95 W |
| Frequency | 13.56 MHz |

TABLE 2

Process parameters for a second precursor monomer

| Parameter | Value |
|---|---|
| Plasma Chamber | |
| Volume | 130 litre |
| Temperature wall | 40-60° C. |
| Electrode layers | RF/ground |
| Pre-treatment | |
| Gas | Oxygen |
| Flow | 200 sccm |
| Power | 200 W |
| Frequency | 13.56 MHz |
| Time | 5 minutes |
| Coating | |
| Monomer | 3-allyloxy-1,2-propanediol |
| Flow | 5-15 sccm |
| Additional gas | None |
| Flow (% of monomer flow) | — |
| Base pressure | 10-20 mTorr |
| Work pressure | 30-50 mTorr |
| Power | 20 W |
| Frequency | 13.56 MHz |

From Tables 1 and 2 it is already clear that the coating of the present invention is deposited at a lower power than the benchmark coating: 20 W instead of 95 W, or 0.15 W/L instead of 0.73 W/L.

Figure 1:
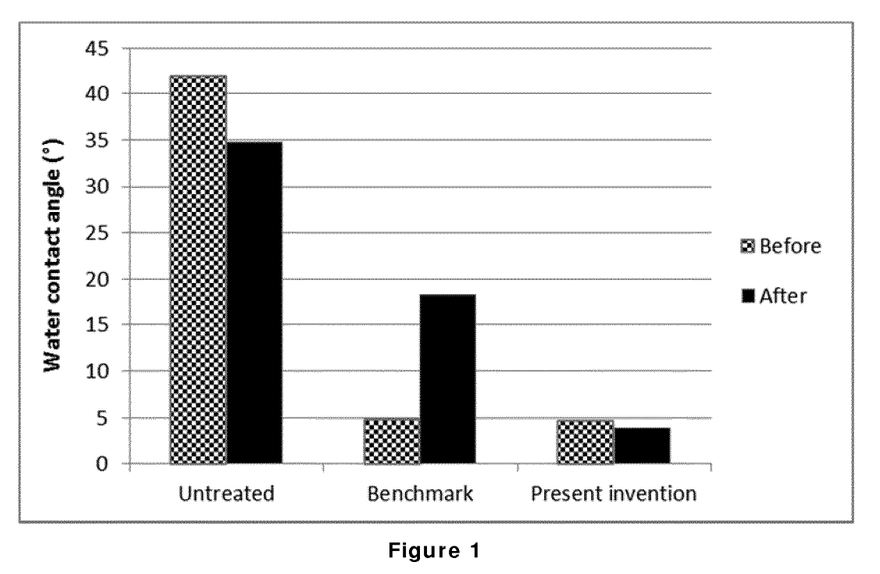
FIG. 1 shows the thermal stability of the coatings according to the present invention compared to a benchmark coating, also deposited by low pressure plasma polymerization as well.

FIG. 1 shows the water contact angle values for the untreated substrate and the same substrate coated with the benchmark coating and the coating of the present invention. When looking at the water contact angle values before the aging test, the benchmark coating and the coating of the present invention have similar values, which are significantly lower than the untreated sample. After the aging test, it is clear that the best results are obtained a coating according to the present invention. The coating of the present invention is much more stable than the benchmark coating, for which a significant increase in water contact angle was measured.

Further, is was noticed after testing that the benchmark coating showed cracks and had become yellow, which are clear signs of degradation and unwanted reactions. Such cracks and yellowing was not noticed for the coatings of the present invention, which supports the data that was obtained, for the coating of the present invention didn't show clear signs of degradation or damage.

Example 2: Thermal Cycle Test—Thermal Stability

Figure 2:
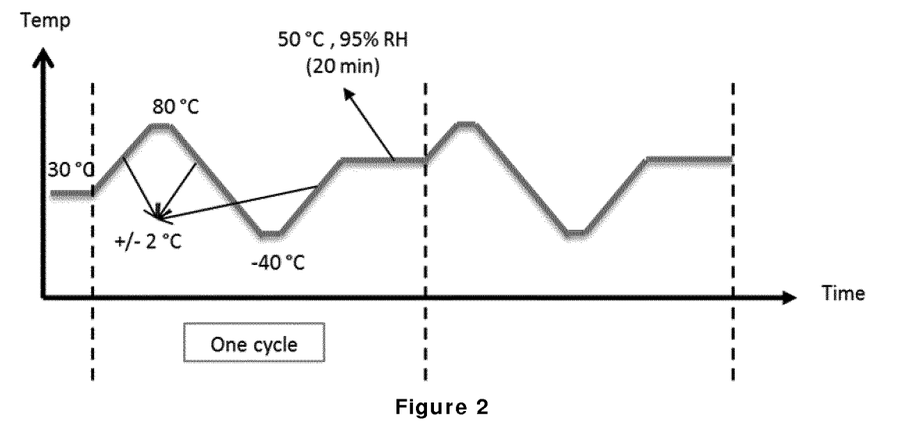
FIG. 2 shows a thermal cycle profile that is used in Example 2.

The coatings have been evaluated for thermal stability by performing a thermal cycle test with a profile according to FIG. 2. This cycle was repeated 5 times.

2.1. Comparison with Benchmark Coating

The coating of the present invention is compared with the untreated substrate and with a benchmark coating. The benchmark coating is a hydrophilic coating deposited by low pressure plasma polymerization as well, using acrylic acid as monomer. Both coatings are deposited in a plasma chamber of 130 litre volume. The benchmarking coating is deposited according to the parameters in Table 1, the coating of the present invention according to the parameters in Table 2.

Figure 3:
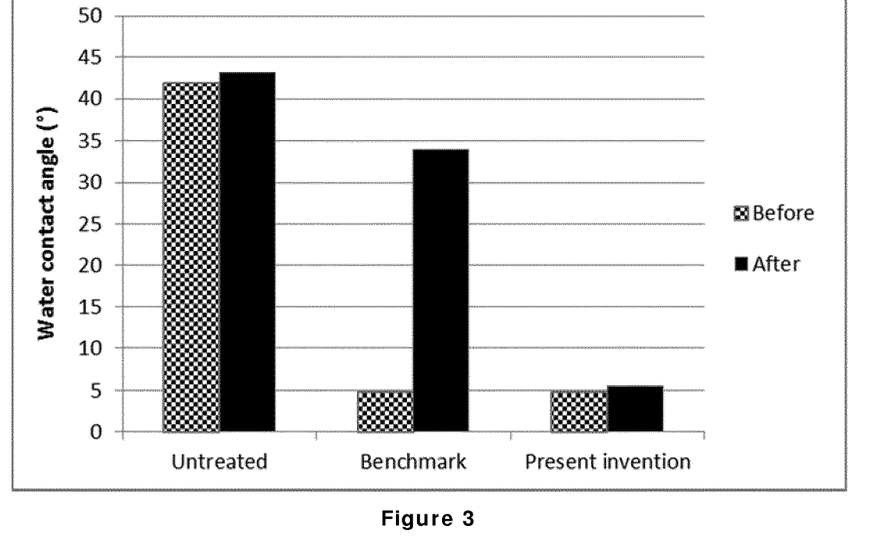
FIG. 3 shows the stability upon thermal cycle testing of the coatings according to the present invention, compared to a benchmark coating, also deposited by low pressure plasma polymerization as well.

FIG. 3 shows the water contact angles of the untreated substrate, and the substrate coated with the benchmark coating and the coating of the present invention, before and after the thermal cycle test. When looking at the water contact angle values before the thermal cycle test, the benchmark coating and the coating of the present invention have similar values, which are significantly lower than the untreated sample. After the test, it is clear that the best results are obtained a coating according to the present invention. The coating of the present invention is much more stable than the benchmark coating, for which a significant increase in water contact angle was measured.

Further, is was noticed after testing that the benchmark coating showed cracks and had become yellow, which are clear signs of degradation and unwanted reactions. Such cracks and yellowing was not noticed for the coatings of the present invention, which supports the data that was obtained, for the coating of the present invention didn't show clear signs of degradation or damage.

Example 3: Durability Test

The coatings have been evaluated for durability by measuring the water contact angle according to ASTM D5946 before and after a droplet of water had been used to wet the surface, after which the water was removed by soaking it up with a soft tissue.

3.1. Comparison with Benchmark Coating

The coating of the present invention is compared with the untreated substrate and with a benchmark coating. The benchmark coating is a hydrophilic coating deposited by low pressure plasma polymerization as well, using acrylic acid as monomer. Both coatings are deposited in a plasma chamber of 130 litre volume. The benchmarking coating is deposited according to the parameters in Table 1, the coating of the present invention according to the parameters in Table 2.

Figure 4:
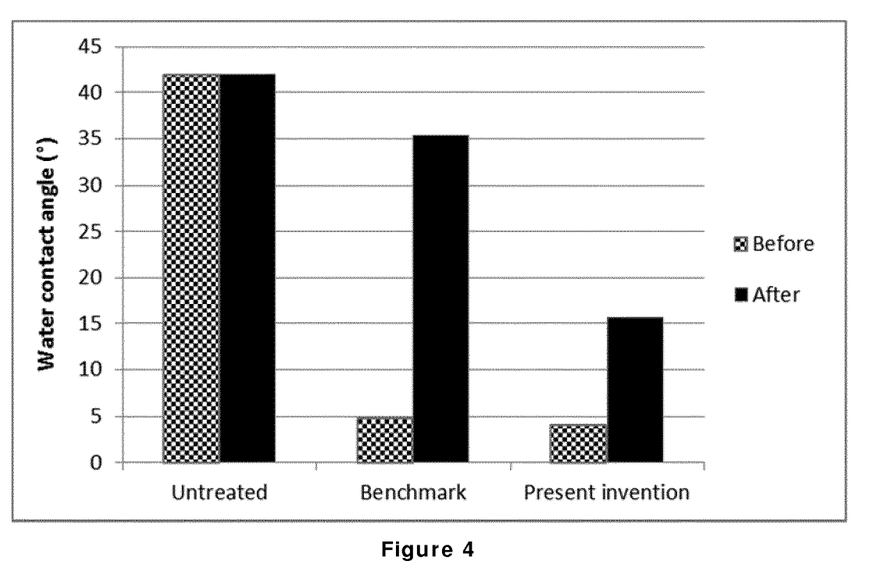
FIG. 4 shows the durability of the coatings according to the present invention, compared to a benchmark coating, also deposited by low pressure plasma polymerization as well.

FIG. 4 shows the water contact angles of the untreated substrate, and the substrate coated with the benchmark coating and the coating of the present invention, before and after the durability test.

When looking at the water contact angle values before the durability test, the benchmark coating and the coating of the present invention have similar values, which are significantly lower than the untreated sample. After the test, it is clear that the best results are obtained a coating according to the present invention. The coating of the present invention is more stable than the benchmark coating resulting in a lower increase in water contact angle.

The invention claimed is:

1. Method to deposit a hydrophilic nanocoating onto a substrate, wherein the coating is deposited by means of a continuous wave low pressure and low power plasma polymerization process in a plasma chamber, wherein the low pressure and low power plasma polymerization process is not plasma graft polymerization, wherein the low power applied during the plasma polymerization process is an essentially constant value of between 0.02 and 2.50 Watt per liter volume of the plasma chamber, and wherein the low pressure applied during the plasma polymerization process is between 2.00 to 26.66 Pa, and using a monomer according to $$CH_2=CR_4-CH_2-O-R_5,$$

wherein $R_4$ is H or an alkyl, and wherein $R_5$ is a substituted alkyl or a substituted alkenyl, and wherein $R_5$ comprises one or multiple hydrophilic functional groups wherein the plasma polymerization process is performed without use of a free radical initiator; wherein the low pressure plasma polymerization process is preceded by a low pressure plasma polymerization step wherein an intermediate nanocoating layer is deposited with a continuous wave of between 0.02 and 2.50 Watt per liter, and wherein the low pressure is between 2.00 to 26.66 Pa, and wherein the intermediate nanocoating layer is deposited using an organosilane precursor monomer according to $Y_1-X-Y_2$, wherein X is O or NH, $Y_1$ is $-Si(Y_3)(Y_4)Y_5$ and $Y_2$ is $Si(Y_{3'})(Y_{4'})Y_{5'}$, wherein $Y_3$, $Y_4$, $Y_5$, $Y_{3'}$, $Y_{4'}$, and $Y_{5'}$ are each independently H or an alkyl group of up to 10 carbon atoms; wherein at most one of $Y_3$, $Y_4$ and $Y_5$ is hydrogen, at most one of $Y_{3'}$, $Y_{4'}$ and $Y_{5'}$ is hydrogen; and the total number of carbon atoms is not more than 20, and wherein an additional gas is introduced into the plasma chamber in combination with the organosilane precursor monomer, said additional gas being $H_2$, $N_2$, $O_2$, $N_2O$, $CO_2$, $CH_4$, He or Ar, or mixtures thereof, said additional gas being introduced with a flow of about 5 to about 50% that of the organosilane precursor monomer.

2. Method according to claim 1, wherein the low pressure plasma intermediate nanocoating layer polymerization step is preceded by a low pressure plasma pre-treatment process, cleaning or etching using a continuous radiofrequency wave power at between 25 and 750 Watts wherein the low pressure plasma pre-treatment process is performed using an inert gas and/or a reactive gas, and wherein the low pressure is between 2.00 to 26.66 Pa.

3. Method according to claim 1, wherein the monomer which is used in the plasma polymerization process are introduced into the plasma chamber in a gaseous state.

4. Method according to claim 3, wherein the plasma chamber and/or a supply line for introducing the monomer in a gaseous state into the plasma chamber is temperature controlled to avoid condensation of the monomer.

5. Method according to claim 1, wherein the substrate is a medical consumable, a biochemical consumable, an electrochemical substrate, a membrane or a textile.

* * * * *